United States Patent [19]
Perego et al.

[11] Patent Number: 6,071,485
[45] Date of Patent: *Jun. 6, 2000

[54] PROCESS FOR THE PREPARATION OF A MICRO-MESO POROUS MATERIAL WITH A HIGH SURFACE AREA AND CONTROLLED DISTRIBUTION OF THE POROSITY

[75] Inventors: Carlo Perego, Carnate; Angela Carati, S. Giuliano Milanese, both of Italy

[73] Assignee: Eniricerche S.p.A., S. Donato Milanese, Italy

[ * ] Notice: This patent issued on a continued prosecution application filed under 37 CFR 1.53(d), and is subject to the twenty year patent term provisions of 35 U.S.C. 154(a)(2).

[21] Appl. No.: 08/866,057

[22] Filed: May 30, 1997

[30] Foreign Application Priority Data

Jun. 13, 1996 [IT] Italy .................. MI96A1202

[51] Int. Cl.[7] .................................... C01B 33/38
[52] U.S. Cl. ...................... 423/326; 423/330.1; 423/707
[58] Field of Search .................................. 423/707, 326, 423/333, 330.1; 502/263, 240

[56] References Cited

U.S. PATENT DOCUMENTS

| | | | |
|---|---|---|---|
| 5,049,536 | 9/1991 | Bellussi et al. | 502/235 |
| 5,434,118 | 7/1995 | Carati et al. | 502/242 |
| 5,444,032 | 8/1995 | Perego et al. | 502/235 |
| 5,498,811 | 3/1996 | Perego et al. | 585/324 |
| 5,578,744 | 11/1996 | Carati et al. | 585/530 |
| 5,602,292 | 2/1997 | Perego et al. | 585/250 |
| 5,625,108 | 4/1997 | Perego et al. | 585/520 |

*Primary Examiner*—Tom Dunn
*Assistant Examiner*—Stuart L. Hendrickson
*Attorney, Agent, or Firm*—Oblon, Spivak, McClelland, Maier & Neustadt, P.C.

[57] ABSTRACT

The present invention relates to a process for the preparation of a micro-meso porous material which comprises:

a) preparing a mixture starting from a tetraalkylorthosilicate, a $C_3$–$C_6$ alkyl alcohol or dialcohol, a tetraalkylammonium hydroxide having the formula $R_1(R_2)_3N$—OH wherein $R_1$ is a $C_3$–$C_7$ alkyl and $R_2$ is a $C_1$ or $C_3$–$C_7$ alkyl, optionally in the presence of one or more metal compounds, in which the molar ratios are within the following ranges:
alcohol/$SiO_2$ < or equal to 20;
$R_1(R_2)_3N$—OH/$SiO_2$ = 0.05–0.4;
$H_2O$/$SiO_2$ = 1–40;
metal oxides/$SiO_2$ = 0–0.02;

b) subjecting this mixture to hydrolysis and subsequent gelation at a temperature of between 20° C. and a temperature close to the boiling point of the alcohol or mixture of alcohols present;

c) subjecting the gel obtained to drying and calcination.

6 Claims, No Drawings

PROCESS FOR THE PREPARATION OF A MICRO-MESO POROUS MATERIAL WITH A HIGH SURFACE AREA AND CONTROLLED DISTRIBUTION OF THE POROSITY

The present invention relates to a process for the preparation of a micro-meso porous material having a high surface area and with a controlled distribution of the porosity.

In particular this process comprises:
a) preparing a mixture starting from a tetraalkylorthosilicate, a $C_3$–$C_6$ alkyl alcohol or dialcohol, a tetraalkylammonium hydroxide having the formula $R_1(R_2)_3N$—OH wherein $R_1$ is a $C_3$–$C_7$ alkyl and $R_2$ is a $C_1$ or $C_3$–$C_7$ alkyl, optionally in the presence of one or more metal compounds, in which the molar ratios are within the following ranges:
alcohol/$SiO_2$<or equal to 20;
$R_1(R_2)_3N$—OH/$SiO_2$=0.05–0.4;
$H_2O$/$SiO_2$=1–40;
metal oxides/$SiO_2$=0–0.02;
b) subjecting this mixture to hydrolysis and subsequent gelation at a temperature of between 20° C. and a temperature close to the boiling point of the alcohol or mixture of alcohols present;
c) subjecting the gel obtained to drying and calcination.

The possibility of synthesizing an amorphous silica-alumina with a high surface area characterized by a narrow distribution of the mesoporosity (with pore dimensions in the range of 37 Å to 150 Å) is described by M. R. Manton and J. C. Davidtz, Journal of Catalysis (1979), Vol. 60, pages 156–166; these materials however have not found practical applications.

Patent application WO 91/11390 describes the possibility of obtaining a new group of meso porous alumino-silicates (called MCM-41) having an average pore diameter of between 20 Å and 100 Å and regularly organized in the material according to a hexagonal or cubic structure.

These materials can be prepared starting from a mixture containing at least one silica source, an alumina source, an organic compound having the formula $R_1R_2R_3R_4N$—OH wherein, at least one of $R_1$, $R_2$, $R_3$ and $R_4$ is selected from hydrogen and an alkyl group with a short chain and, optionally, a second quaternary ammonium base having the above formula $R_1R_2R_3R_4N$—OH wherein, however, $R_1$, $R_2$, $R_3$ and $R_4$ are selected from hydrogen and a $C_1$–$C_5$ alkyl group, two of the alkyl groups can be considered as jointly forming a cyclic compound.

The mixture is subjected to hydrothermal treatment at a temperature of between 25° C. and 250° C. for a duration of between 5 minutes and 14 days.

The product obtained is characterized by an X-ray diffraction spectrum (XRD) from powders resulting in a hexagonal structure with a bidimensional order or a structure with cubic symmetry.

Tests carried out with high resonance transmission electronic microscopy (HREM) show, in the case of MCM-41 with a hexagonal symmetry, the presence of monodimensional mesoporosity regularly organized according to a honeycomb hexagonal structure.

In these materials the aluminum is in tetrahedric coordination giving the material acidity and in addition these materials are extremely stable to thermal treatment.

U.S. Pat. Nos. 5,434,118 and 5,049,536 and Italian patent application MI 93 A 02696 disclose a further possibility of obtaining amorphous metallo-silicates, called MSA (Bellussi G. et al., Stud. Surf. Sci. Catal., (1994), Vol. 84, page 85), having a rather narrow distribution of the pore dimensions (average diameter of between 20 and 40 Å, basic absence of pores with a diameter of more than 40 Å), surface area >500 $m^2$/g, pore volume of 0.4–0.8 ml/g).

Using the terminology suggested by IUPAC Manual of Symbols and Terminology, Appendix 2, Part I Coll., Surface Chem. Pure Appl. Chem., (1972), Vol. 31, page 578 in which micropores are defined as pores with a diameter of less than 20 Å and mesopores, pores with a diameter of between 20 and 500 Å, these materials can be classified as micro-meso porous.

These materials have excellent catalytic properties which derive from the fact that the preparation method used allows a uniform distribution of the metal; when the metal is aluminum, a tetrahedric coordination is observed, at the $^{27}$Al-MAS-NMR spectrum (Bellussi G. et al., Stud. Surf. Sci. Catal., (1994), Vol. 84, page 85), and this allows the MSA described above, to be classified as zeolite-like materials.

The process for the synthesis of the above materials comprises mixing a silica source (preferably selected from tetraalkylorthosilicates) and a soluble salt of a transition metal or a metal belonging to Groups III A, IV A or V A of the Periodic Table, with an aqueous solution of a tetraalkylammonium hydroxide ($R_4N$—OH, with R=ethyl, n-propyl, n-butyl, n-pentyl).

The solution obtained is then gelated by heating it to a temperature of between 50° C. and 110° C.; the gel obtained is then dried and calined to give the end-product.

The hydrolysis and gelation phase is most conveniently carried out in a reactor equipped with a reflux cooler or in a closed pressure-resistant reactor, operating at autogenous pressure, to avoid the elimination of the alcohols present.

Patent applications EP 95 200 093.3 and EP 96 104 680.2 also describe the possibility of preparing micro-meso porous metallo-silicates, called ERS-8, characterized by a narrow distribution of the pore dimensions with an average diameter of <40 Å, a pore volume of between 0.3 and 1.3 ml/g, a surface area of between 500 and 1200 $m^2$/g.

Whereas the MSA are completely amorphous, the ERS-8 are characterized by an X-ray diffraction spectrum (XRD) from powders which has a widespread reflection at low angles, indicating a "short-range" ordering of the micro-meso porous structure.

More specifically, the XRD spectrum registered by means of a Philips vertical diffractometer, equipped with a proportional impulse counter, divergent and recipient slides of 1/6° and with CuK$\alpha$ radiation ($\lambda$=1.54178 Å), is characterized by the presence of a single enlarged diffraction line, or however by a widespread "scattering", angular values of not more than 2θ=5°, whereas other coherent "scattering" phenomena for higher angular values are not observed.

This can be interpreted with the presence of a "short-range" ordering of the micro-meso porous structure, a structural correlation substantially limited only to the immediate neighbours.

These materials consist of a silica matrix in which one or more metal oxides are possibly uniformly dispersed, in which the metals are selected from transition metals or metals belonging to Groups III A, IV A or V A of the Periodic Table.

It has now been surprisingly found that the selection of a prepatative method of the above compounds and the suitable modification of some of the operating conditions allow materials to be obtained with analogous characteristics but with improved catalytic properties.

The present invention therefore relates to a process for the preparation of a micro-meso porous material having a high surface area with a controlled distribution of the porosity, which basically comprises subjecting to hydrolysis, gelation and subsequent calcination, a solution of tetraalkylorthosilicate, an alcohol, a tetralkylammonium hydroxide, possibly in the presence of one or more metal compounds.

In particular, the process according to the present invention comprises:

a) preparing a mixture starting from a tetraalkylorthosilicate, a $C_3$–$C_6$ alkyl alcohol or dialcohol, a tetraalkylammonium hydroxide having the formula $R_1(R_2)_3N$—OH wherein $R_1$ is a $C_3$–$C_7$ alkyl and $R_2$ is a $C_1$ or $C_3$–$C_7$ alkyl, optionally in the presence of one or more metal compounds, in which the molar ratios are within the following ranges:
alcohol/$SiO_2$<or equal to 20;
$R_1(R_2)_3N$—OH/$SiO_2$=0.05–0.4;
$H_2O$/$SiO_2$=1–40;
metal oxides/$SiO_2$=0–0.02;

b) subjecting this mixture to hydrolysis and subsequent gelation at a temperature of between 20° C. and a temperature close to the boiling point of the alcohol or mixture of alcohols present;

c) subjecting the gel obtained to drying and calcination.

In particular it is preferable to use a tetraalkylammonium hydroxide with a $C_6$–$C_7$ alkyl group; when the hydroxide is alkyltrimethylammonium the alkyl group is $C_4$–$C_7$.

The alcohol is preferably selected from propanol and butanol, whereas the hydrolysis and gelation treatment is preferably carried out at a temperature of between 25 and 50° C.

The advantages relating to this process are:

1) the use of an alcohol with from 3 to 5 carbon atoms, which allows the surface area and pore volume values to be maximized without substantially modifying the distribution; this use also permits the operation to be carried out in a homogeneous system making the mixing of the reagents less critical;

2) more rapid hydrolysis and gelation times which can be reduced to a few minutes, normally varying from 5' to 1 hour;

3) operating in an open system to guarantee the basic conservation in the reaction environment of both the alcohol developed during the hydrolysis of the silicon alkoxide and that added, either the same or different, it is necessary for the temperatures to be maintained within a range of room temperature and a temperature lower than the boiling point of the alcohol or the mixture of alcohols present.

The material thus obtained is characterized by a surface area of more than 500 $m^2$/g, a pore volume of between 0.3 and 1.3 ml/g, an average pore diameter of less than 40 Å, and its XRD spectrum does not have a crystalline structure, but possibly a widespread "scattering" with angular values of not more than $2\theta=5°$.

This material can be conveniently used as a heterogeneous catalyst, as an adsorbent or as a carrier for catalysts in industrial processes, in the fields of refining, petrochemistry, basic chemistry and fine chemistry.

The following examples are provided for a better illustration of the present invention and for its embodiment but should not be considered as limiting the scope of the invention itself.

EXAMPLE 1

Preparation of Catalyst 1 in an Open System 7.4 g of tetrahexylammonium hydroxide (aqueous solution at 40% by weight), 248 g of n-butanol and 31 g of water are mixed, at room temperature in a 400 $cm^3$ laboratory beaker.

1.2 g of aluminum sec-butoxide and 52 g of tetraethylorthosilicate are mixed separately and are then added to the solution previously prepared.

The composition of the mixture, expressed as molar ratios, is the following:

$Al_2O_3$/$SiO_2$=0.01;
tetrahexylammonium hydroxide/$SiO_2$=0.032;
$H_2O$/$SiO_2$=8;
n-BuOH/$SiO_2$=13.

After about 30 minutes of stirring, there is the formation of a transparent gel which is left to age for about 20 hours, is then dried in an oven at 120° C. under vacuum and finally calcined at 550° C. for 8 hours in air, obtaining catalyst 1.

The XRD spectrum does not show the presence of significant "scattering" phenomena at low angles.

The specific surface area proved to be equal to 1111 $m^2$/g, the specific pore volume 1.02 ml/g, with an average pore diameter of 40 Å.

EXAMPLE 2

Preparation of Catalyst 2 in an Open System 17.5 g of n-heptyltrimethylammonium hydroxide (aqueous solution at 27.6% by weight), 33 g of water and 1 g of aluminum isopropoxide are mixed, at room temperature in a 400 $cm^3$ laboratory beaker.

The mixture is heated to about 60° C. until the complete dissolution of the aluminum salt, and is then cooled to room temperature.

52 g of tetraethylorthosilicate and 126 g of n-propanol are mixed separately and are then added to the solution previously prepared.

The composition of the mixture, expressed as molar ratios, is the following:

$Al_2O_3$/$SiO_2$=0.01;
n-heptyltrimethylammonium hydroxide/$SiO_2$=0.11;
$H_2O$/$SiO_2$=9;
n-PrOH/$SiO_2$=8.

After about 30 minutes of stirring, there is the formation of a transparent gel which is left to age for about 20 hours, is then dried in an oven at 120° C. under vacuum and finally calcined at 550° C. for 8 hours in air, obtaining catalyst 2.

The XRD spectrum does not show the presence of significant "scattering" phenomena at low angles.

The specific surface area proved to be equal to 872 $m^2$/g, the specific pore volume 0.85 ml/g, with an average pore diameter of 40 Å.

EXAMPLE 3

Comparative

Preparation of Catalyst 3 in a Closed System

In this example the following molar ratios of the components of the reaction mixture are used:

$Al_2O_3$/$SiO_2$=0.01;
tetrapropylammonium hydroxide/$SiO_2$=0.09;
$H_2O$/$SiO_2$=15.

4.727 Kg of water and 3.922 Kg of tetrapropylammonium hydroxide used in the form of an aqueous solution at 14% by weight, are charged into a 20 liter pressure-resistant reactor.

The solution is heated in the reactor and when the temperature reaches 60° C., 0.120 Kg of Al(OiPr)$_3$ (aluminum isopropoxide—Fluka) are added.

The mixture is left at this temperature in the closed reactor and under stirring for a time necessary for the complete dissolution of the aluminum compound (about 40 minutes).

At this point the temperature of the reactor is brought to 90° C. and 6.250 Kg of TEOS (tetraethylorthosilicate) are added by means of an appropriate valve.

At the end of the addition, the valve is closed, the temperature is fixed at 88° C. and the reactor is left under these conditions for 3 hours.

The pressure reaches a maximum value of 1.5 bars.

A viscous liquid product is thus obtained which, after aging for about 12 hours, is dried in a rotavapor under vacuum at about 60 torr and then calcined in air at 550° C. for about 8 hours, obtaining catalyst 3.

The XRD spectrum does not show the presence of significant "scattering" phenomena at low angles.

The specific surface area of the same solid is 656 m$^2$/g, the pore volume is 0.473 ml/g, with an average pore diameter of 40 Å.

EXAMPLE 4

Catalytic Evaluation

In this example the catalytic activity is evaluated of the materials synthesized according to the previous examples in the oligomerization reaction of propylene, using the following operating conditions:

WHSV (Weight Hourly Space Velocity)=4 h$^{-1}$;

pressure=35 bars;

temperature=150° C.

The conversion % was calculated on the propylene fed after 63 hours of reaction.

Catalyst 1 provides a conversion equal to 87%, catalyst 2 equal to 79% whereas catalyst 3 equal to 67%.

What is claimed is:

1. A process for the preparation of a micro-meso porous material which comprises:
   a) preparing a mixture comprising a tetraalkyl-orthosilicate, at least one C$_4$–C$_6$ alkyl alcohol, a dialcohol, or a mixture thereof, a tetraalkylammonium hydroxide having the formula R$_1$(R$_2$)$_3$N—OH wherein R$_1$ is a C$_3$–C$_7$ alkyl and R$_2$ is a C$_1$ or C$_3$–C$_7$ alkyl, optionally in the presence of one or more metal oxides, in which the molar ratios are within the following ranges:
   alkyl alcohol/SiO$_2$ is up to 20;
   R$_1$(R$_2$)$_3$N—OH/SiO$_2$ is from 0.05 to 0.4;
   H$_2$O/SiO$_2$ is from 1 to 40;
   metal/SiO$_2$ is up to 0.021;
   b) subjecting this mixture to hydrolysis and subsequent gelation at a temperature of between 20° C. and a temperature lower than the boiling point of the alcohol or mixture of alcohols present to obtain a gel;
   c) subjecting the gel obtained to drying and calcination;
   wherein said process is carried out in an open system.

2. The process according to claim 1, wherein said porous material has a surface area of greater than 500 m$^2$/g and pore volume of 0.4 to 0.8 ml/g.

3. The process according to claim 1, wherein the tetraalkylammonium hydroxide has a C$_4$–C$_7$ alkyl group.

4. A process for the preparation of a micro-meso porous material which comprises:
   a) preparing a mixture comprising:
      a tetraalkyl-orthosilicate, and at least one alcohol selected from the group consisting of a C$_3$–C$_6$ alkyl alcohol and a dialcohol;
      an aqueous solution of tetraalkylammonium hydroxide having the formula R$_1$(R$_2$)$_3$N—OH, wherein R$_1$ is a C$_7$ alkyl and R$_2$ is a C$_1$ or C$_3$–C$_7$ alkyl; and
      optionally in the presence of one or more metal oxides;
   in which the molar ratios are within the following ranges:
   alkyl alcohol/SiO$_2$ is from 0.05 to 0.4;
   H$_2$O/SiO$_2$ is from 1 to 40;
   metal oxide/SiO$_2$ is 0 to 0.02;
   b) subjecting this mixture to hydrolysis and subsequent gelation at a temperature of between 20° C. and a temperature lower than the boiling point of the alcohol or mixture of alcohols present to obtain a gel;
   c) subjecting the gel obtained to drying and calcination;
   wherein said process is carried out in an open system.

5. A process for the preparation of a micro-meso porous material which comprises:
   a) preparing a mixture comprising:
      a tetraalkyl-orthosilicate and at least one alcohol selected from the group consisting of a butanol and a dialcohol,
      an aqueous solution of a C$_7$tetraalkylammonium hydroxide having the formula R$_1$(R$_2$)$_3$N—OH, wherein R$_1$ is a C$_3$–C$_7$ alkyl and R$_2$ is a C$_1$ or C$_3$–C$_7$ alkyl, and
   optionally in the presence of one or more metal oxides;
   in which the molar ratios are within the following ranges:
   alkyl alcohol/SiO$_2$ is up to 20;
   R$_1$(R$_2$)$_3$N—OH/SiO$_2$ is from 0.05 to 0.4;
   H$_2$O/SiO$_2$ is from 1 to 40;
   metal oxide/SiO$_2$ is up to 0.021;
   b) subjecting this mixture to hydrolysis and subsequent gelation at a temperature of between 20° C. and a temperature lower than the boiling point of the alcohol or mixture of alcohols present to obtain a gel;
   c) subjecting the gel obtained to drying and calcination;
   wherein said process is carried out in an open system.

6. A process for the preparation of a micro-meso porous material which comprises:
   a) preparing a mixture comprising:
      a tetraalkyl-orthosilicate and at least one alcohol selected from the group consisting of a C$_3$–C$_6$ alkyl alcohol and a dialcohol;
      an aqueous solution of a tetraalkylammonium hydroxide having the formula R$_1$(R$_2$)$_3$N—OH, wherein R$_1$ is a C$_3$–C$_7$ alkyl and R$_2$ is a C$_1$ or C$_3$–C$_7$ alkyl; and
      optionally in the presence of one or more metal oxides;
   in which the molar ratios are within the following ranges:
   alkyl alcohol/SiO$_2$ is up to 20;
   R$_1$(R$_2$)$_3$N—OH/SiO$_2$ is from 0.05 to 0.4;
   H$_2$O/SiO$_2$ is from 1 to 40;
   metal oxide/SiO$_2$ is up to 0.021;
   b) subjecting this mixture to hydrolysis and subsequent gelation at a temperature of between 25° C. and 50° C. to obtain a gel;
   c) subjecting the gel obtained to drying and calcination;
   wherein said process is carried out in an open system.

* * * * *